United States Patent [19]

Brandon et al.

[11] 4,007,533
[45] Feb. 15, 1977

[54] APPARATUS FOR STRIPPING AN ANODE BLOCK FROM AN ANODE ASSEMBLY

[75] Inventors: Ross H. Brandon, Detroit; Peter P. Zeffer, Harper Woods, both of Mich.

[73] Assignee: Jervis B. Webb Company, Detroit, Mich.

[22] Filed: Nov. 24, 1975

[21] Appl. No.: 634,840

[52] U.S. Cl. .................................. 29/762; 29/252; 29/427; 104/96; 214/89

[51] Int. Cl.² ........................................ B23P 19/04

[58] Field of Search ............ 29/203 R, 200 D, 252, 29/427; 104/96, 172 S; 214/89

[56] References Cited

UNITED STATES PATENTS

| | | | |
|---|---|---|---|
| 3,326,139 | 6/1967 | Torrance et al. | 104/96 |
| 3,708,128 | 1/1973 | Limpinsel et al. | 29/200 D X |

*Primary Examiner*—Carl E. Hall
*Attorney, Agent, or Firm*—Farley, Forster and Farley

[57] ABSTRACT

Apparatus for stripping an anode block, or butt, from an anode assembly used in aluminum smelting includes a conveyor having a carrier from which the anode assembly is suspended and a stripping station on the path of travel of the conveyor. At the stripping station, the support of the anode assembly is transferred from the carrier to an anvil which is mounted in the path of movement of the anode assembly so as to be engageable by the yoke portion thereof. The transfer is accomplished by lowering the carrier and anode assembly on a lift section of the conveyor, stabilizing the anode assembly against longitudinal and transverse swinging movements, and forwarding the carrier and the anode assembly along the lift section to a stripping position by a feeding device, the yoke of the anode assembly engaging an upwardly inclined ramp surface on the anvil during this forwarding movement and thereby transferring the weight of the anode assembly from the carrier to the anvil. A pair of pivoted stripping heads then move downwardly against the upper face of the anode block, stripping it from the yoke, and any portion of the anode block which still remains attached to the yoke is stripped therefrom by the anvil as the lift section is raised.

15 Claims, 3 Drawing Figures

APPARATUS FOR STRIPPING AN ANODE BLOCK FROM AN ANODE ASSEMBLY

SUMMARY OF THE INVENTION

This invention relates to apparatus for stripping the anode block or butt from an anode assembly used in aluminum smelting.

Such an anode assembly consists of a carbon anode block suspended from the lower end of a vertical rod by a yoke, which in its simplest form is an inverted U-shaped member having its base portion attached to the lower end of the rod and its legs engaged in sockets in the carbon block by thimbles.

When an anode assembly is used in smelting, the carbon anode block gradually erodes to a non-usable butt, and the anode assembly is then reprocessed to replace the but by a new carbon anode block. One of the reprocessing operations requires that the butt be removed or stripped from the yoke of the anode assembly. This same reprocessing must sometimes be performed on an anode assembly having an unused, but defective, anode block, and in the description to follow, the term "anode block" includes both an unused block and a used block, or butt.

Present smelters employ overhead power and free conveyors for transporting anode assemblies to and from the pot room, each anode assembly being suspended from a carrier of the conveyor by a chain attachment secured to the carrier and to the upper end of the anode assembly rod.

The present invention provides apparatus which enables an anode block to be stripped from an anode assembly secured to the carrier of a power and free conveyor, with the stripping operation being carried out through the coaction of elements of the conveyor and elements of a stripping station located along the path of the conveyor.

Stripping apparatus according to the invention comprises a conveyor track, a carrier mounted on the track and an anode assembly suspended from the carrier, the anode assembly including a rod having its upper end attached to the carrier, a yoke secured to the lower end of the rod and an anode block attached to the yoke; means for propelling the carrier along the track; a stripping station including a fixedly mounted anvil located below the track and having a supporting surface engageable by the yoke of the anode assembly, transfer means operable to transfer the support of the anode assembly from the conveyor carrier to the supporting surface of the anvil; and stripping means movable relative to the anvil into engagement with the anode block of the anode assembly to strip the anode block from the yoke.

Preferably the transfer means includes a lift section in the carrier track movable between a raised position of horizontal alignment therewith and a lowered position in which the yoke of the anode assembly is engageable with the supporting surface of the anvil, and an indexing feeder device for moving the carrier and the anode assembly from an initial position in advance of the anvil to a stripping position in which the yoke is seated on the supporting surface which includes an upwardly inclined entry portion engageable by the yoke during the movement to the stripping position, and causing the weight of the anode assembly to be transferred to the anvil. Stabilizing means prevents longitudinal and transverse swinging movements to the anode assembly during the transfer and stripping cycles.

The anvil is a cantilever supported member, which extends longitudinally in the upstream direction from a pedestal or base, and which is dimensioned so as to be straddled by the legs of the yoke and to span that portion of the upper face of the anode block which is bordered transversely by the legs of the yoke. When the cycle of the stripping means has been completed, the lift section is raised, and the anvil acts to strip any remaining portion of the anode block bridging the legs of the yoke.

Other features of the invention will appear from the description to follow of the presently preferred embodiment shown in the accompanying drawings.

DESCRIPTION OF THE PREFERRED EMBODIMENT

Figure 1:
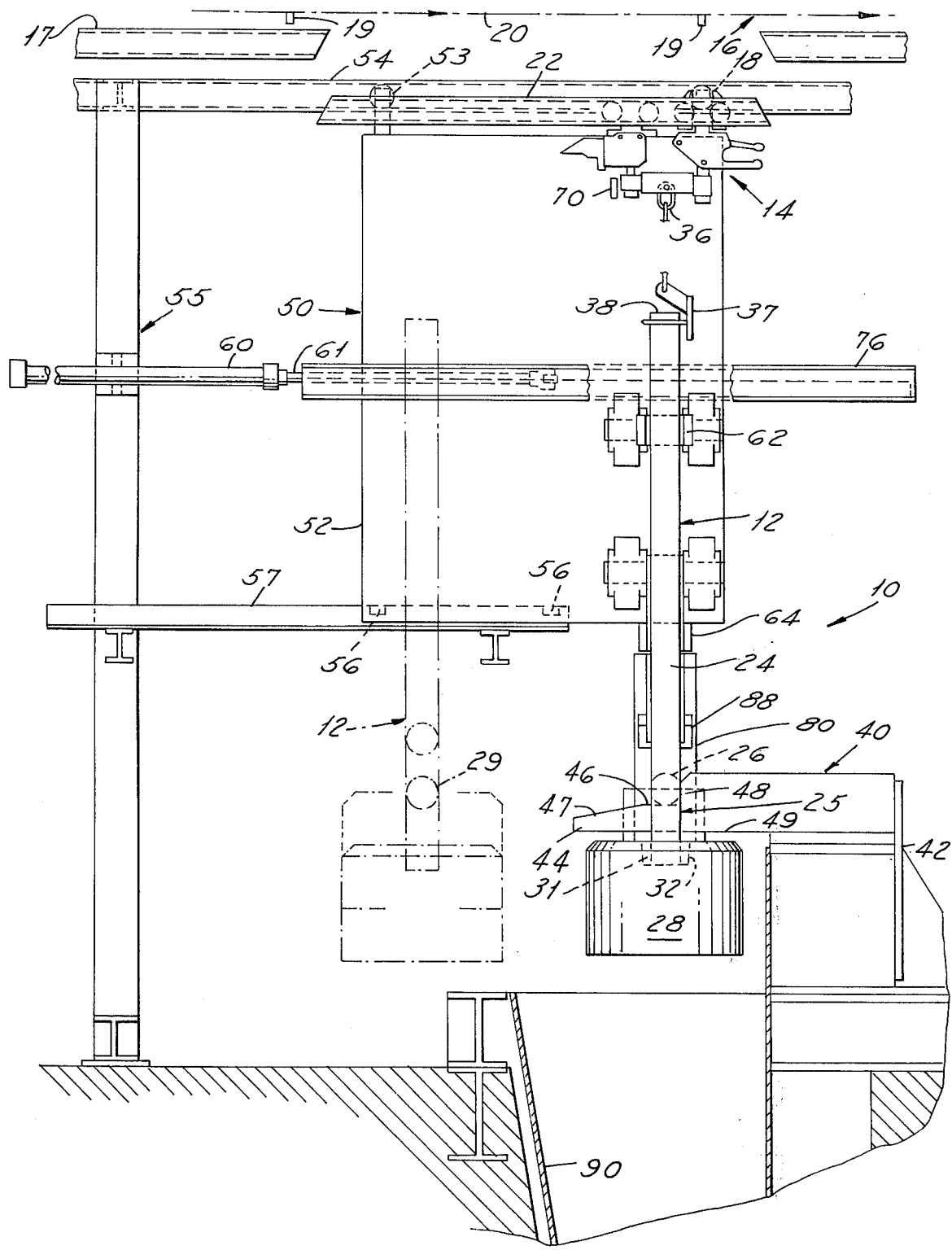
FIG. 1 is a side elevation showing the anode stripping apparatus of the invention, including an overhead power and free conveyor provided with a lift section at the stripping station.
Figures 2, 3:
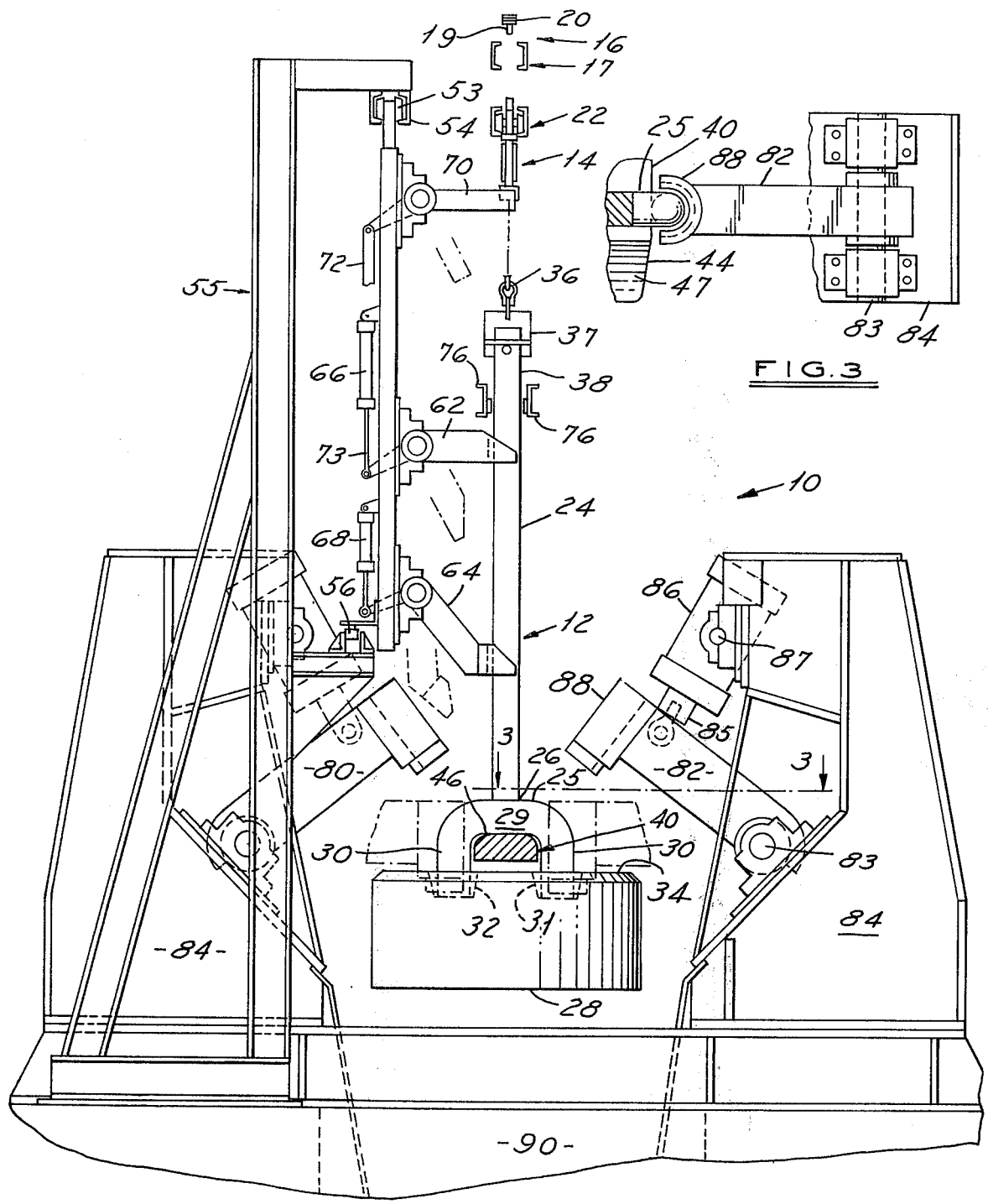
FIG. 2 is a transverse elevation, partly in section, of the apparatus shown in FIG. 1.
FIG. 3 is a detailed plan view of one of the stripper arms, taken as indicated by the line 3—3 of FIG. 2.

FIGS. 1 and 2 illustrate the stripping apparatus of the invention at a stripping station 10 arranged along the path of travel of an anode assembly 12 suspended from a carrier 14 of an overhead power and free conveyor 16.

The conveyor 16 includes a track 17 on which the carrier 14 is supported and travels, the carrier having a driving dog 18 engageable by one of a plurality of pushers 19 depending from a chain 20 supported by trolleys and by a power track (not shown) mounted above the carrier track 17 in the conventional manner. A lift section 22 is provided in the carrier track 17 at the stripping station 10. The lift section 22, which is of known construction and hence has not been shown in detail, is movable between a raised position of horizontal alignment with the carrier track 17 and a lowered position shown in FIGS. 1 and 2. Preferably, the lift section 22 is constructed as taught by U.S. Pat. No. 3,326,139 so that the carrier 14 can be propelled onto and off of the lift section, in the raised position thereof, by the pushers 19 of the power chain 20. Optionally, the raised position, or elevation of the carrier track 17, the chain 20, and associated parts of the conveyor 16 may be greater than shown in FIGS. 1 and 2 so that a carrier can be propelled through the stripping station, by-passing the stripping operation.

The driving dog 18 of the conveyor carrier 14 is movable between an upper driving position and a lower non-driving position as taught by U.S. Pat. No. 3,044,416; and, movement of the carrier 14 along the track 17 or the lift section 22 may be arrested by a stop (not shown) as taught by U.S. Pat. No. 3,434,431.

Each anode assembly 12 consists of a rod 24, a yoke 25 attached to the lower end 26 of the rod and a carbon anode block 28 secured to the yoke. In the construction shown (FIG. 2) the yoke 25 is U-shaped, having a base portion 29, to which the lower end 26 of the rod is attached, and a pair of downwardly projecting legs 30 which are anchored by thimbles 31 in sockets 32 formed in the upper face of the anode block 28 so that the base portion 29 of the yoke is spaced above the upper face 34 of the anode block. Suspension means consisting of a chain 36 and fitting 37 are employed to attach the upper end 38 of the rod 24 of the anode assembly to the carrier 14.

At the anode stripping station 10, an anvil 40 is fixed in cantilever fashion to a suitable support or pedestal 42 and is located below the carrier track 17, projecting from the pedestal 42 in the upstream direction with reference to the direction of carrier movement along the track 17. The anvil 40 has a nose portion 44 dimensioned to project between the legs 30 of the yoke 25, and has an upper supporting surface 46 engageable by the base 29 of the yoke. As shown in FIG. 1, the surface 46 includes an upwardly inclined entry portion 47, and is terminated by a vertical shoulder 48. The lower surface 49 of the anvil is horizontal and preferably spans the upper surface 34 of the anode block 28 for a purpose to be presently described.

Transfer means at the stripping station 10 is operable to transfer the support of the anode assembly 12 from the conveyor carrier 14 to the supporting surface 46 of the anvil. In the construction shown, the transfer means includes the lift section 22, and feeding means 50 operable to advance the carrier 14 and the anode assembly 12 from an initial position (shown in broken line in FIG. 1), in which the anode assembly 12 is in advance of the anvil 40, to a stripping position (shown in full line in FIG. 1) in which the anode assembly 12 is engaged with and supported by the anvil.

The feeding means 50 includes a plate or frame 52, supported by trolleys 53 from a track 54 carried by suitable structure 55, and guided by rollers 56 engaging a lower guide track 57 supported by the structure 55. A fluid pressure cylinder 60 mounted on the structure 55, as shown in FIG. 1, has a rod 61 connected to the feeder frame 52 for moving it between the initial and stripping positions of the anode assembly mentioned above.

Mounted on the frame 52 are a pair of pivoted stabilizing yokes 62 and 64 movable into and out of engagement with the rod 24 of the anode assembly 12 by fluid pressure cylinders 66 and 68, as best shown in FIG. 2; and, a pusher bar 70 movable into and out of engagement with the carrier 14, preferably by a link connection 72 to the rod 73 of the fluid pressure cylinder 66. The yokes 62 and 64, when engaged with the rod 24, stabilize the anode assembly 12 against swinging movement parallel to the path of travel. Stabilization of the anode assembly 12 against swinging movement in a direction transversely of the path of travel is provided by a pair of guide rails 76.

The stripping station 10 also includes stripping means in the form of a pair of arms 80 and 82 mounted on opposite sides of the anvil for movement relative thereto. Each stripping arm is mounted on a pivot 83 supported by a pedestal 84 and is connected to the rod 85 of an actuating cylinder 86 supported on a trunnion 87 carried by the pedestal 84. A stripping head 88 on the free end of each stripping arm, is shaped as shown in FIG. 3 to clear the yoke 25 of the anode assembly and engage the anode block 28 in the area adjacent to one of the legs 30 of the yoke 25.

In the operation of the apparatus, with the lift section 22 in the raised position, a carrier 14 and anode assembly 12 are propelled into the stripping station 10 to the initial position by a pusher 19 of the power chain 20, the rod 24 of the anode assembly 12 entering between the guide tracks 76. The lift section 22 is then moved to the lowered position, and in this position the underside of the base portion 29 of the anode assembly yoke 25 is below the level of the anvil supporting surface 46. Next, the stabilizing yokes 62 and 64 on the feeding means 50 are actuated to engage the rod 24 of the anode assembly, the pusher 70 of the feeding means is moved into position for engagement with the carrier 14, and the feeding cylinder 60 is operated to advance the carrier 14 and the anode assembly 12 from the initial position shown in broken line in FIG. 1 to the stripping position shown in full line. During this advancing movement, the yoke 25 of the anode assembly straddles the portion 44 of the anvil 40 and rides up the inclined surface 47 onto the supporting surface 46 and locates against the shoulder 48 in position for stripping. Movement of the yoke 25 upwardly along the inclined surface 47 transfers the weight of the anode assembly from the carrier 14 to the anvil 40; and, the inclined surface 47 is provided with an overall length and change of elevation sufficient to compensate for dimensional differences in anode assemblies, which can be relatively great, particularly due to variances in the length of the rods 24.

The stripping arms 80 and 82 are then operated by the cylinders 86 to move the stripping heads 88 into engagement with the anode block 28 and force the block off the thimbles 32 on the ends of the legs 30 of the yoke 25. On completion of the stripping cycle, the lift section 22 is moved to the raised position, and the lower surface 49 of the anvil 40 acts to strip any portion of the anode block 28 that may remain bridging the legs 30 of the yoke. Retraction of the stabilizing yokes 62 and 64, and the pusher 70 of the feeding means, permits the feeding means to be returned to the initial positon to engage the next carrier, and the stripped anode assembly to be moved from the stripping station 10 by a pusher 19 of the power chain 20.

All of the foregoing operations are automatically interrelated and sequenced by control elements and circuitry which involve known techniques and which therefore have not been shown.

The apparatus enables an anode block to be stripped from an anode assembly being transported on a conveyor carrier by stabilizing the anode assembly against pendulous movements; by transferring the weight of the anode assembly from the conveyor carrier to a fixed anvil and compensating for any variance in length between anode assemblies in this transfer operation; and by employing the combination of stripper heads, movable into engagement with the anode block, and upward movement of the anode assembly by a conveyor lift section to insure complete stripping of the anode block, the anvil being employed as part of the stripping mechanism. The stripper heads are pivoted on bearings located outside of the stripping area and thus protected from contamination by the stripped material which gravitates into a suitable chute or hopper 90.

We claim:

1. Apparatus for stripping an anode block from an anode assembly which consists of said anode block, a yoke attached thereto, and a rod having one end secured to the yoke, said apparatus comprising:

an anode assembly conveyor including a carrier track, a carrier supported thereon, and means for propelling the carrier along the carrier track;

suspension means attaching the other end of the rod of the anode assembly to the carrier;

a stripping station located along the path of carrier travel on the carrier track;

said stripping station including a fixedly mounted anvil located below the carrier track and having supporting means for engaging the yoke of the anode assembly, transfer means for transferring the support of the anode assembly from the conveyor carrier to said supporting means, stripping means mounted adjacent to the anvil for movement relative thereto, and means for moving the stripping means into engagement with the anode block of the anode assembly supported by said supporting means to strip the anode block from the yoke.

2. Apparatus according to claim 1 wherein said transfer means includes a lift section in the carrier track movable between a raised position of horizontal alignment therewith and a lowered position in which the yoke of the anode assembly is engageable with the supporting means of the anvil.

3. Apparatus according to claim 2 wherein said transfer means further includes feeding means for advancing the carrier and the anode assembly suspended therefrom along the lift section from an initial position in which the anode assembly is in advance of the anvil to a stripping position in which the yoke of the anode assembly is engaged with and supported by the anvil.

4. Apparatus according to claim 3 wherein the anvil comprises a member extending longitudinally of the path of carrier travel, said member having an upper surface forming said supporting means, said upper surface including an upwardly inclined entry portion engageable by the yoke of the anode assembly during the advancing movement thereof by said feeding means to raise the yoke of the anode assembly and thereby transfer the support of the anode assembly to said supporting means.

5. Apparatus according to claim 4 further including means for stabilizing the anode assembly during the advancing movement thereof by said feeding means.

6. Apparatus according to claim 5 wherein said stabilizing means comprises a pair of guide rails extending parallel to the path of carrier travel and engageable by the rod of the anode assembly to restrain movement thereof transversely of the path of travel, and a rod engaging yoke movably carried by the feeding means to restrain movement of the anode assembly parallel to the path of travel.

7. Apparatus according to claim 1 wherein said transfer means comprises feeding means for advancing the carrier and the anode assembly suspended therefrom along the carrier track from an initial position in which the anode assembly is in advance of the anvil to a stripping position in which the yoke of the anode assembly is engaged with and supported by the anvil, the anvil supporting means including a yoke engaging surface having an entry portion which is inclined upwardly so as to raise the anode assembly and thereby transfer the support thereof to said supporting means.

8. Apparatus according to claim 7 further including means for stabilizing the anode assembly against swinging movement during operation of said feeding and stripping means.

9. Apparatus according to claim 1 wherein the anvil includes an abutment engageable by the yoke of an anode assembly to locate the anode block relative to said stripping means.

10. Apparatus according to claim 1 wherein the yoke of the anode assembly has a base portion secured to said rod, and a plurality of legs extending downwardly from the base portion into attachment with the upper face of the anode block at locations thereon spaced transversely relative to the path of carrier travel; and wherein the anvil comprises a cantilever mounted member whose free end projects upstream relative to the direction of carrier travel, said anvil member having an upper surface providing said supporting means and engageable by the base portion of the yoke, and said anvil member having a lower surface opposed to that portion of the upper face of the anode block between the legs of the yoke.

11. Apparatus according to claim 10 wherein the upper surface of the anvil member includes an entry portion which is inclined upwardly in the direction of carrier travel and which forms part of said transfer means.

12. Apparatus according to claim 10 further comprising means for moving the rod and yoke of the anode assembly relative to the anvil member subsequently to movement of the stripping means whereby any portion of the anode block remaining between the legs of the yoke is stripped by engagement with the lower surface of the anvil member.

13. Apparatus according to claim 12 wherein said means for moving the rod and yoke of the anode assembly relative to the anvil member comprises a lift section in the carrier track, said lift section forming part of said transfer means.

14. Apparatus according to claim 13 wherein said lift section is movable between a raised position of horizontal alignment with the carrier track and a lowered position in which the upper surface of the anvil member is engageable by the base portion of the yoke.

15. For use with an anode assembly including a rod, a yoke secured to one end of the rod and an anode block having an upper face attached to the yoke, apparatus for stripping the anode block from the yoke comprising:

an anvil having supporting means for engaging the yoke of the anode assembly, the anvil having a lower surface opposed to at least a portion of the upper face of the anode block;

stripping means for engaging the anode block of an anode assembly whose yoke is engaged with the supporting means of the anvil; and, means for moving the rod and yoke of the anode assembly relative to the anvil subsequently to the engagement of the anode block by said stripping means whereby any remaining portion of the anode block opposed to the lower surface of the anvil is stripped by said lower surface.

* * * * *